United States Patent [19]

Shiota et al.

[11] Patent Number: 5,086,234
[45] Date of Patent: Feb. 4, 1992

[54] METHOD AND APPARATUS FOR COMBINED-CLOSED-CYCLE MAGNETOHYDRODYNAMIC GENERATION

[75] Inventors: Susumu Shiota, Yokohama; Kunio Yoshikawa, Sagamihara, both of Japan

[73] Assignee: Tokyo Institute of Technology, Tokyo, Japan

[21] Appl. No.: 554,441

[22] Filed: Jul. 19, 1990

[30] Foreign Application Priority Data

Jul. 31, 1989 [JP] Japan .................. 1-196888

[51] Int. Cl.$^5$ .............................. F02C 6/20
[52] U.S. Cl. .......................... 290/52; 310/11
[58] Field of Search ................ 310/11; 290/52

[56] References Cited

U.S. PATENT DOCUMENTS 3,720,850 3/1973 Way ........................ 310/11
3,895,243 7/1975 Ameno et al. ............ 310/11

Primary Examiner—J. R. Scott
Assistant Examiner—Lawrence E. Colbert
Attorney, Agent, or Firm—Spencer & Frank

[57] ABSTRACT

A method and apparatus for magnetohydrodynamic (MHD) generation of a combined-closed-cycle type using an MHD generator and a gas turbine-generator unit. A heater heats ooperative fluid to introduce the heated operative fluid into an MHD generator for power generation. The operative fluid is passed from the MHD generator to a compressor through a first portion of a heat exchanger. The compressed operative fluid is introduced from the compressor to a gas tubine-generator unit through a second portion of the heat exchanger, so that the gas turbine-generator unit generates power by the compressed operative fluid. The heat exchanger recovers heat energy of the operative fluid between the first and second portions thereof. After power generation, the operative fluid is returned to the heater form the turbine-generator unit to complete a combined-closed-cycle of the operative fluid.

6 Claims, 2 Drawing Sheets

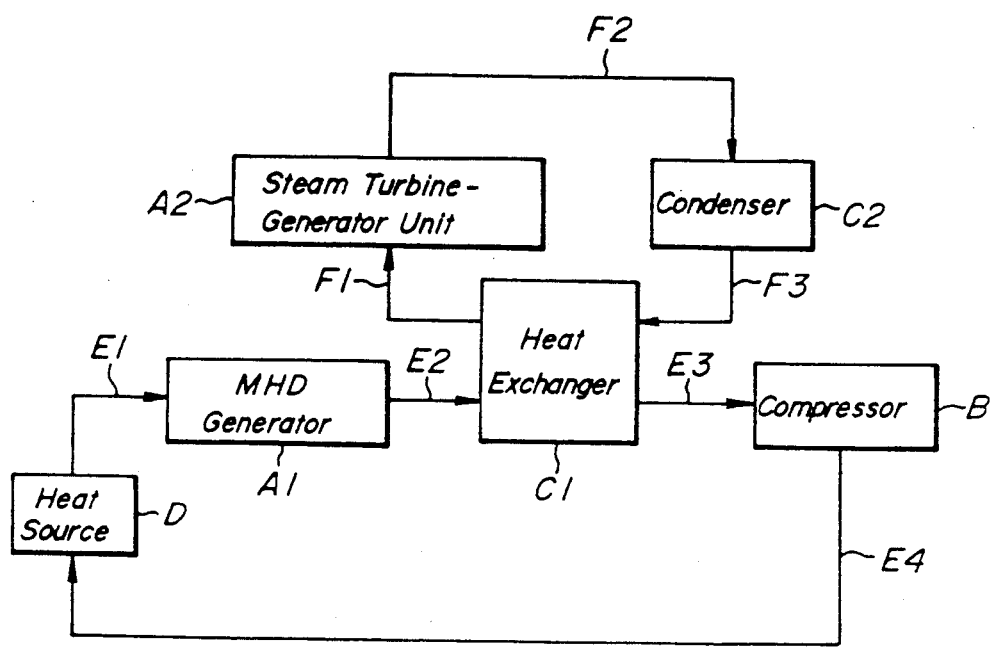
FIG_2 PRIOR ART
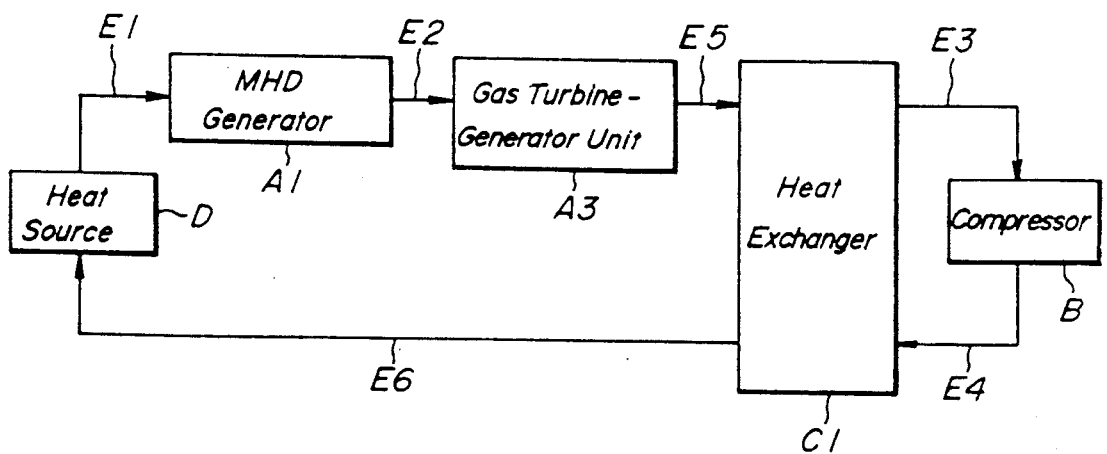
FIG_3 PRIOR ART

METHOD AND APPARATUS FOR COMBINED-CLOSED-CYCLE MAGNETOHYDRODYNAMIC GENERATION

BACKGROUND OF THE INVENTION

1. Field of the Invention

This invention relates to a method and an apparatus for combined-closed-cycle magnetohydrodynamic (MHD) generation which simultaneously uses an MHD generator and a gas turbine-generator unit, the heat source for the generation being fossil fuel such as coal and petroleum, nuclear energy such as energy released by fission or fusion, or solar energy. More particularly, the invention relates to durability improvement and size reduction of machinery for the combined-closed-cycle MHL generation, while retaining the high energy conversion efficiency of conventional combined-cycle MHD generation.

2. Related Art Statement

In conventional closed-cycle MHD generation, a suitable operative fluid, e.g., a rare gas, is heated to a high temperature by a high-temperature heat source, such as coal, petroleum, other suitable fossil fuel, nuclear fission energy, nuclear fusion energy, or solar energy. After added with a conductivity-improving seed agent is added to the rare gas, e.g., an alkali metal, the heated operative fluid is introduced into a magnetic field for conversion of the thermal energy thereof into electric energy through a magnetohydrodynamic process. The operative fluid is returned to the heat source after the conversion, so as to complete a closed-cycle of operative fluid.

The temperature of the operative fluid in closed-cycle MHD generation is much higher that the highest operating temperature of steam or gas in conventional thermal power plant machinery such as steam turbine-generator units or gas turbine-generator units. Hence, the closed-cycle MHD generation is suitable for use in combination with a high temperature heat source. Besides, the operative fluid outflowing from the MHD generator is still at a comparatively high temperature. Thus, it is generally preferred to connect a conventional generator unit downstream of the operative fluid from the MHD generator, which conventional generator unit operates at a lower temperature than the MHD generator. With the downstream generator unit, a closed-cycle of the operative fluid for combined generation is formed, and the energy of the high temperature heat source can be converted into electric energy at a high efficiency.

Two types of combined generation with the closed-cycle MHD generation have been proposed; namely, one type using a steam turbine-generator unit, and another type using a gas turbine-generator unit, the generator unit of either type being connected downstream of an MHD generator.

FIG. 2 shows an example of conventional combined generation using a steam turbine-generator unit connected to an MHD generator having a closed-cycle. In the example, a rare gas El heated to a high temperature at a heat source D is introduced to an MHD generator A1 for generating electric power. Post-operation rare gas E2 outflowing from the MHD generator A1 enters into a heat exchanger C1 and is cooled there. The cooled rare gas E3 enters into a compressor B and is compressed. Then, the compressed rare gas E4 returns to the heat source D, so that a closed-loop or closed-cycle of the rare gas E1 through E4 is completed.

On the other hand, the heat of the high-temperature rare gas E2 from the MHD generator A1 is transferred to water or vapor F at the heat exchanger C1, so as to produce heated vapor F1 which drives a steam turbine-generator unit A2 for generating electric power. The outflow vapor F2 from the steam turbine-generator unit A2 is condensed into water F3 by a condenser C2. The condensed water F3 is heated by the heat exchanger C1 as described above. Thus, a closed-loop or closed-cycle of water and vapor F1 through F3 is formed. The MHD generator A1 and the steam turbine-generator unit A2 are driven by the rare gas loop E1-E4 and the water and vapor loop F1-F3, respectively. The net electric output power is defined by the difference between the sum of outputs from the two generators A1 and A2 and driving load power of the compressor B.

FIG. 3 shows an example of conventional combined generation using a gas turbine-generator unit connected to a closed-cycle MHD generator. In the example of FIG. 3, a rare gas E1 heated to a high temperature at a heat source D is introduced to an MHD generator A1 for producing electric power through the MHD process. Post-operation rare gas E2 outflowing from the MHD generator A1 enters into a gas turbine-generator unit A3 for generating electric power. In this conventional arrangement, the gas turbine-generator unit A3 is disposed immediately downstream of the MHD generator A1. Exhaust rare gas E5 from the gas turbine-generator unit A3 enters into a heat exchanger C1 and is cooled there. The cooled rare gas E3 enters into a compressor B and is compressed. The compressed rare gas E4 is heated in the heat exchanger C1 by the above-mentioned exhaust rare gas E5 at a comparatively high temperature, and the heated rare gas E6 returns to the heat source D, so that a closed-loop or closed-cycle of the rare gas E1 through E6 is completed. Both of the MHD generator A1 and the gas turbine-generator unit A3 are driven by the rare gas loop E1-E6. The net electric output power is given by the difference between the sum of outputs from the two generators A1 and A3 and driving load power of the compressor B.

As compared with the combined generation of FIG. 2 having heat losses at both cooling water lines for the compressor B and the condenser C2, the combined generation of FIG. 3 has a heat loss only at the cooling water line for the compressor B. Thus, the combined generation of FIG. 3 converts a larger portion of the heat energy input at the heat source D than that in the combined generation of FIG. 2, so that the energy conversion efficiency of combined generation of FIG. 3 is higher than that of FIG. 2.

Thus, with the combined generation of FIG. 2, the heat loss at the condenser C2 is added to the cooling water loss at the compressor B, and there is a limit in the ratio of output electric power to the input energy to the rare gas E from the heat source D. In short, the combined generation of FIG. 2 has a shortcoming in that the energy conversion efficiency of combined generation is comparatively low.

Despite that the energy conversion efficiency can be somewhat improved by the combined generation of FIG. 3 as pointed out above, the closed-loop generation of FIG. 3 has a shortcoming in that the compression ratio at the compressor B of FIG. 3 is required to be higher than that of FIG. 2. In particular, there is a certain preferred range of the pressure of the heated rare gas E1 to be introduced to the MHD generator A1 depending on the intensity of the magnetic field thereat. On the other hand, the pressure of the cooled rare gas E3 entering the compressor B of FIG. 3 is lower than that in FIG. 2 because of the presence of the gas turbine-generator unit A3. Hence, to achieve the preferred range of the pressure, the compressor B of FIG. 3 must have a higher compression ratio than that of FIG. 2, and the compressor B of FIG. 3 becomes larger than that of FIG. 2.

Further, the post-operation rare gas E2 outflowing from the MHD generator A1 contains alkali metal vapor as a seed agent, and such alkali metal vapor also enters into the gas turbine-generator unit A3 in FIG. 3. Thus, the closed-loop generation of FIG. 3 has another shortcoming in that the turbine blades of the gas turbine-generator unit A3 are susceptible to corrosion by the alkali metal vapor.

SUMMARY OF THE INVENTION

Therefore, an object of the present invention is to provide an improved method and an improved apparatus for MHD generation of the combined-closed-cycle type including an MHD generator and a gas turbine-generator unit, so as to overcome the above-mentioned shortcomings of the prior art. The method and apparatus of the invention retain the high energy conversion efficiency of the conventional closed-cycle MHD generation of FIG. 3, and yet the method and apparatus of the invention not only facilitate the size reduction of the compressor of the rare gas or operative fluid, but also prevents corrosion of the gas turbine blades by the alkali metal vapor.

An object of the present invention is to provide a method for electric power generation by a combined-closed-cycle including a magnetohydrodynamic (MHD) generator and a gas turbine-generator unit, comprising the steps of heating an operative fluid at a heater, introducing the heated operative fluid into an MHD generator so as to convert energy of the heated operative fluid into electric power, passing the operative fluid outflowing from said MHD generator through a first portion of a heat exchanger, introducing the operative fluid outflowing from the first portion of said heat exchanger into a compressor so as to compress the operative fluid, passing the compressed operative fluid from said compressor through a second portion of said heat exchanger so as to recover heat energy of the operative fluid between the first and second portion of said heat exchanger, introducing the operative fluid outflowing from the second portion of said heat exchanger into a turbine-generator unit so as to convert energy of the compressed operative fluid into electric power, and returning the operative fluid outflowing from said turbine-generator unit into said heater so as to complete a combined-closed-cycle of the operative fluid.

In said method for electric power generation, said operative fluid is a rare gas.

Another object of the invention is to provide an electric power generating apparatus of the combined-closed-cycle type having a magnetohydrodynamic (MHD) generator and a gas turbine-generator unit, comprising a heater for heating operative fluid, an MHD generator connected to said heater so as to receive the heated operative fluid from the heater so as to convert energy of the heated operative fluid into electric power, a heat exchanger having a first portion and a second portion, said first portion being connected to the MHD generator so as to receive the operative fluid outflowing therefrom, a compressor connected to said heat exchanger so as to receive and compress the operative fluid outflowing from the first portion thereof, the second portion of said heat exchanger being connected to said compressor so as to receive the compressed operative fluid therefrom for recovering heat energy of the operative fluid between the first and second portions of said heat exchanger, and a turbine-generator unit connected to the second portion of said heat exchanger so as to receive the compressed operative fluid therefrom for converting energy of the compressed operative fluid into electric power, said turbine-generator unit being connected to said heater so as to complete a combined-closed-cycle of the operative fluid.

In said method and apparatus for electric power generation, said operative fluid is a rare gas.

In said electric power generating apparatus, the apparatus further comprises a means disposed in said heater for adding alkali metal vapor as a conductivity-improving agent into the operative fluid, and a means disposed in the first portion of said heat exchanger for removing said alkali metal vapor from the operative fluid.

To fulfill the above object, the combined-closed-cycle MHD generation of the invention departs from that of FIG. 3 in that the gas turbine-generator unit A3 is not disposed immediately downstream of the MHD generator A1 but downstream of the compressor B which is inserted between the two generators A1 and A3 as shown in FIG. 1. Thus, the rare gas or operative fluid E3 at the inlet of the compressor B is at a higher pressure than that of FIG. 3, and the compressor B is freed from the burden of a higher compression ratio. A heat exchanger C1 is inserted between the MHD generator A1 and the compressor B, so that a seed agent such as alkali metal vapor can be removed from the operative fluid by cooling at the heat exchanger C1 before its entry into the gas turbine-generator unit A3, and the gas turbine blades are freed from corrosion by the seed agent. The cooling of the exhaust rare gas or operative fluid E2 from the MHD generator A1 is effected by extraction of heat therefrom by the compressed rare gas or operative fluid E4 at the heat exchanger C1. Thus, the compressed rare gas E4 is heated at the heat exchanger C1, and the heated rare gas E6 drives the turbine-generator unit A3.

An embodiment of the method for combined-closed-cycle MHD generation according to the invention comprises steps of heating an operative fluid at a heater, introducing the heated operative fluid into an MHD generator so as to convert energy of the heated operative fluid into electric power, passing the operative fluid outflowing from the MHD generator through a first portion of a heat exchanger, introducing the operative fluid outflowing from the first portion of said heat exchanger into a compressor so as to compress the operative fluid, passing the compressed operative fluid from the compressor through a second portion of the heat exchanger so as to recover heat energy of the operative fluid between the first and second portions of the heat exchanger, introducing the operative fluid outflowing from the second portion of the heat exchanger into a turbine-generator unit so as to convert energy of the compressed operative fluid into electric power, and returning the operative fluid outflowing from the turbine-generator unit into the heater so as to complete a combined-closed-cycle of the operative fluid.

An embodiment of the apparatus for combined-closed-cycle type MHD generation according to the present invention comprises a heater for heating the operative fluid, an MHD generator connected to the heater so as to receive the heated operative fluid from the heater for converting the energy of the heated operative fluid into electric power, a heat exchanger having a first portion and a second portion, the first portion being connected to the MHD generator so as to receive the operative fluid outflowing therefrom, a compressor connected to the heat exchanger so as to receive and compress the operative fluid outflowing from the first portion thereof, the second portion of the heat exchanger being connected to the compressor so as to receive the compressed operative fluid therefrom for recovering heat energy of the operative fluid between the first and second portions of the heat exchanger, and a turbine-generator unit connected to the second portion of the heat exchanger so as to receive the compressed operative fluid therefrom for converting thermal energy of the compressed operative fluid into electric power, the turbine-generator unit being connected to the heater so as to complete a combined-closed-cycle of the operative fluid.

With the method and apparatus of the invention, duration improvement and size reduction of machinery for combined-closed-cycle MHD generation can be achieved while retaining a high energy conversion efficiency of the prior art. The invention facilitates the use of generator units of conventional type in combination with an MHD generator while allowing various energy sources for heating the operative fluid to a high temperature; for instance, fossil fuels, nuclear fission energy, nuclear fusion energy, and solar energy.

BRIEF DESCRIPTION OF THE DRAWING

For a better understanding of the invention, reference is made to the accompanying drawing, in which:

FIG. 2 is a block diagram of an example of conventional combined-closed-cycle MHD generation; and FIG. 3 is a block diagram of another example of conventional combined-closed-cycle MHD generation.

Figure 1:
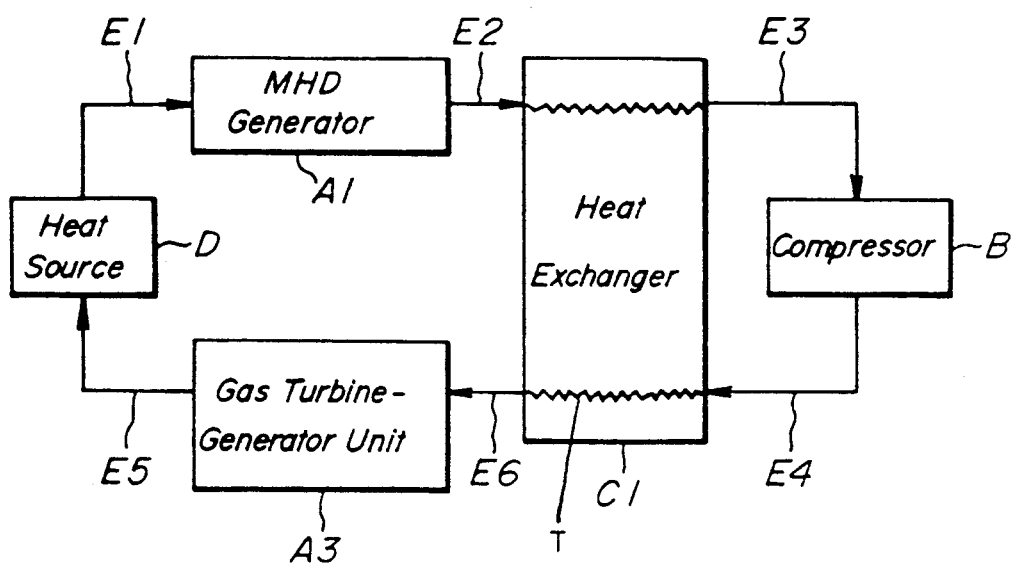
FIG. 1 is a block diagram showing the formation of a combined-closed-cycle MHD generation according to the present invention.

Throughout different figures of the drawing, A1 is an MHD generator, A2 is a steam turbine-generator unit, A3 is a gas turbine-generator unit, B is a compressor, C1 is a heat exchanger, C2 is a condenser, D is a heat source, E1-E6 represent rare gas at different stages of a closed-cycle, and F1-F3 represent water or vapor.

DESCRIPTION OF THE PREFERRED EMBODIMENT

The invention will now be described in further detail by referring to a preferred embodiment thereof which is schematically shown in FIG. 1.

The embodiment of FIG. 1 has a heat source D connected to an MHD generator A1, and the exhaust side of the MHD generator A1 is connected to a compressor B through a heat exchanger C1. The output side of the compressor B is connected to a gas turbine-generator unit A3 through the heat exchanger C1, and the exhaust side of the gas turbine-generator unit A3 is connected to the heat source D so as to complete the closed-cycle with a combination of the MHD generator A1 and the gas turbine-generator unit A3.

In operation, the heat source D heats an operative fluid or rare gas E1 to a high temperature, and the high-temperature rare gas E1 is introduced to the MHD generator A1 for converting the thermal energy of the rare gas E1 into electric energy. The post-operation rare gas E2 outflowing from the MHD generator A1 enters into a first portion of the heat exchanger C1 so as to be cooled therein. The cooled rare gas E3 is compressed by the compressor B, and the compressed rare gas E4 enters into a second portion of the heat exchanger C1 so as to be heated therein while cooling the post-operation rare gas E2. The heated-compressed-rare gas E6 from the heat exchanger C1 enters into the gas turbine-generator unit A3 for converting the thermal energy thereof into electric energy. The effluent rare gas E5 from the gas turbine-generator unit A3 returns to the heat source D to complete a combined-closed-cycle of the rare gas E1-E6.

The above combined-closed-cycle includes a combination of the two generators, i.e., the MHD generator A1 and the gas turbine-generator unit A3. The net output of the combined-closed-cycle becomes the difference between the sum of the generated powers of the two generators A1 and A3 and power consumed for driving the compressor B.

For comparison, let it be assumed that the rare gas temperatures at the intake and exhaust of the MHD generator A1 and at the intake and exhaust of the gas turbine-generator unit A3 in the combined-closed-cycle of the invention of FIG. 1 are the same with the rare gas temperatures at the corresponding intakes and exhausts of the generators A1 and A3 in the conventional combined-closed-cycle of FIG. 3. Then, it is possible in the closed-cycle of the invention to obtain the same outputs from the MHD generator A1 and the gas turbine-generator unit A3 of FIG. 1 as those of the conventional combined-closed-cycle of FIG. 3, using the same power for driving the rare gas compressor B. Thus, the combined-closed-cycle of the invention as shown in FIG. 1 can perform the combined generation at the same high energy conversion efficiency as the conventional combined-closed-cycle of FIG. 3.

As to the pressure in the closed-cycle of FIG. 1, the pressure of the rare gas E6 at the intake of the gas turbine-generator unit A3 can be made higher than the pressure of the heated rare gas E1 at the intake of the MHD generator A1 by using the compressor B. Thus, the absolute values of the pressure of the rare gas E in FIG. 1 can be considerably higher than that of FIG. 3, while maintaining the same pressure ratio across the inlet and outlet of the compressor B and the same pressure ratio across the inlet and exhaust of the gas turbine-generator unit A3. Thus, the sizes of the gas turbine-generator unit A3 and the compressor B can be considerably reduced.

Further, in the combined-closed-cycle of the invention, the seed agent such as an alkali metal vapor, which is added to the operative fluid or the rare gas E1 upstream of the MHD generator A1 for instance at the heat source D, can be removed from the exhaust rare gas E2 of the MHD generator A1 when the exhaust rare gas E2 is cooled in the heat exchanger C1 by the compressed rare gas E4 from the compressor B. More specifically, such seed agent or alkali metal vapor may be deposited on the low-temperature surfaces of heat exchange Tubes T of the heat exchanger C1. Thus, the seed agent or alkali metal vapor can be almost completely removed or recovered when the cooled rare gas E3 leaves the heat exchanger C1. The recovered seed agent may be added again to the operative fluid at a point upstream of the MHD generator A1, so as complete a closed-cycle of the seed agent. With such seed agent recovery, the rare gas E6 entering the gas turbine-generator unit A3 is substantially free from the seed agent, and the problem of turbine blade corrosion by the seed agent or the alkali metal vapor experienced in the conventional combined-closed-cycle of FIG. 3 can be substantially suppressed and the durability of the machinery is considerably improved.

As can be understood from the foregoing description, with the combined-closed-cycle MHD generation according to the present invention, the following outstanding effects can be achieved.

(1) In the MHD generation of the present invention, the entire thermal energy given to the operative fluid at the heat source D can be converted into electric energy except the thermal energy transferred to the coolant or cooling water at an intermediary cooler in the compressor B. In other words, the non-converted thermal energy loss is restricted to the above-mentioned transfer to the coolant alone. Thus, the thermal energy given to the operative fluid can be converted into electric energy at a higher efficiency than any of the following conventional thermal generations; namely, the thermal generation by a steam turbine-generator unit alone, the combined-cycle generation using a steam turbine-generator unit and a gas turbine-generator unit, and the conventional combined-closed-cycle generation using an MHD generator and a steam turbine-generator unit.

(2) As compared with the conventional combined-closed-cycle generation using an MHD generator and a gas turbine generator unit, the energy conversion efficiency of the invention is similar. The generation scheme of the invention, however, disposes the gas turbine-generator unit A3 not immediately downstream of the MHD generator A1, but downstream of the compressor B which is inserted between the generators A1 and A3. Thus, the pressure of the operative fluid or rare gas can be raised at both the inlet and outlet of the compressor B. Consequently, the sizes of the compressor B and the gas turbine-generator unit A3 can be reduced while retaining a high energy conversion efficiency.

(3) A seed agent such as an alkali metal in a rare gas can be almost completely removed or recovered in the heat exchanger C1, because the post-operation operative fluid or rare gas is introduced to the gas turbine-generator unit A3 only after passing through the heat exchanger C1. Thus, it becomes possible to drive the gas turbine-generator unit A3 by the operative fluid or rare gas which is substantially free from seed agent or alkali metal, and the durability of the turbine blades is improved to a great extent.

Although the present invention has been described with a certain degree of particularity, it is understood that the present disclosure has been made only by way of example and that numerous changes in the details of formation and the combination and arrangement of parts may be resorted to without departing from the spirit and the scope of the invention as hereinafter claimed.

What is claimed is:

1. A method for electric power generation by a combined-closed-cycle including a magnetohydrodynamic (MHD) generator and a gas turbine-generator unit, comprising the steps of heating an operative fluid at a heater, introducing the heated operative fluid into an MHD generator so as to convert energy of the heated operative fluid into electric power, passing the operative fluid outflowing from said MHD generator through a first portion of a heat exchanger, introducing the operative fluid outflowing from the first portion of said heat exchanger into a compressor so as to compress the operative fluid, passing the compressed operative fluid from said compressor through a second portions of said heat exchanger so as to recover heat energy of the operative fluid between the first and second portion of said heat exchanger, introducing the operative fluid outflowing from the second portion of said heat exchanger into a turbine-generator unit so as to convert energy of the compressed operative fluid into electric power, and returning the operative fluid outflowing from said turbine-generator unit into said heater so as to complete a combined-closed-cycle of the operative fluid.

2. A method for electric power generation as set forth in claim 1, wherein said operative fluid is a rare gas.

3. A method for electric power generation as set forth in claim 1, which method further comprises the steps of adding alkali metal vapor as a conductivity-improving agent into the operative fluid in said heater, and removing said alkali metal vapor from the operative fluid in the first portion of said heat exchanger.

4. An electric power generating apparatus of the combined-closed-cycle type having a magnetohydrodynamic (MHD) generator and a gas turbine-generator unit, comprising a heater for heating operative fluid, an MHD generator connected to said heater so as to receive the heated operative fluid from the heater so as to convert energy of the heated operative fluid into electric power, a heat exchanger having a first portion and a second portion, said first portion being connected to the MHD generator so as to receive the operative fluid outflowing therefrom, a compressor connected to said heat exchange so as to receive and compress the operative fluid outflowing from the first portion thereof, the second portion of said heat exchanger being connected to said compressor so as to receive the compressed operative fluid therefrom for recovering heat energy of the operative fluid between the first and second portions of said heat exchanger, and a turbine-generator unit connected to the second portion of said heat exchanger so as to receive the compressed operative fluid therefrom for converting energy of the compressed operative fluid into electric power, said turbine-generator unit being connected to said heater so as to complete a combined-closed-cycle of the operative fluid.

5. An electric power generating apparatus as set forth in claim 1, wherein said operative fluid is a rare gas.

6. An electric power generating apparatus as set forth in claim 1, which apparatus further comprises a means disposed in said heater for adding alkali metal vapor as a conductivity-improving agent into the operative fluid, and a means disposed in the first portion of said heat exchanger for removing said alkali metal vapor from the operative fluid.

* * * * *